United States Patent [19]
Nguyen et al.

[11] Patent Number: 5,919,425
[45] Date of Patent: *Jul. 6, 1999

[54] CATALYZED PACKING MATERIAL FOR REGENERATIVE CATALYTIC OXIDATION

[75] Inventors: Pascaline H. Nguyen, Holmdel; James M. Chen, Edison; Bulent O. Yavuz, Westfield; Howard J. Furbeck, Hamilton Square, all of N.J.

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/531,845

[22] Filed: Sep. 21, 1995

[51] Int. Cl.⁶ .......................... B01D 53/04; B01D 53/38; B01J 23/56

[52] U.S. Cl. .................. 423/210; 423/239.1; 423/245.1; 423/247; 502/20; 502/38; 502/325; 502/334; 502/339

[58] Field of Search ................................ 502/20, 38, 325, 502/334, 339; 423/210, 239.1, 245.1, 247

[56] References Cited

U.S. PATENT DOCUMENTS

| | | | |
|---|---|---|---|
| 3,870,474 | 3/1975 | Houston | 23/277 |
| 4,134,860 | 1/1979 | Hindin et al. | 252/466 |
| 4,522,940 | 6/1985 | Sambrook et al. | 502/328 |
| 5,262,131 | 11/1993 | Bayer et al. | 422/175 |

FOREIGN PATENT DOCUMENTS

| | | | |
|---|---|---|---|
| 0 351 036 | 12/1989 | European Pat. Off. | B01J 35/02 |
| 0 351 036 A1 | 1/1990 | European Pat. Off. | |
| 0351036 | 1/1990 | European Pat. Off. | |
| 0472605 | 1/1994 | European Pat. Off. | F23G 7/06 |
| 0 629 432 | 9/1994 | European Pat. Off. | B01D 53/04 |
| 0 629 432 A1 | 12/1994 | European Pat. Off. | B01D 53/36 |
| 0629432 | 12/1994 | European Pat. Off. | B01D 53/36 |
| 2 037 607 | 12/1979 | United Kingdom | B01J 12/24 |
| WO 90/14560 | 11/1990 | WIPO | F23G 7/06 |
| 23149 | 11/1993 | WIPO | B01D 53/36 |
| WO 93/23149 | 11/1993 | WIPO | B01D 53/36 |
| WO 95/24590 | 9/1995 | WIPO | F23G 7/06 |

OTHER PUBLICATIONS

Ruddy and Carrell, "Select the Best VOC Control Strategy," Chemical Engineering Progress, Jul. 1993, (pp. 28–35).
Ruhl, "Recover VOCs via Adsorption on Activated Carbon," Chemical Engineering Progress, Jul. 1993 (pp. 37–41).

*Primary Examiner*—Michael Lewis
*Assistant Examiner*—Alexander G. Ghyra

[57] ABSTRACT

Homogeneous catalytic regenerative heat transfer packing material is made by impregnating ceramic packing material with a solution of a catalyst precursor and then fixing the precursor into catalyst form. The catalyzed packing material is suitable for use in a process for the regenerative catalytic oxidation of waste gases, in particular, gases that include volatile organic compounds, carbon monoxide or combinations thereof.

24 Claims, No Drawings

CATALYZED PACKING MATERIAL FOR REGENERATIVE CATALYTIC OXIDATION

BACKGROUND OF THE INVENTION

1. Field of the Invention

This invention relates to novel homogeneous regenerative catalyzed packing material suitable for the regenerative catalytic oxidation of waste gases such as, but not limited to, volatile organic compounds, carbon monoxide and combinations thereof. A particular embodiment of the invention is a process for making such catalytic packing material by impregnating porous regenerative heat transfer packing material with a solution of a catalyst precursor, and then fixing the precursor into catalyst form.

2. Description of Related Art

Air pollutants, such as volatile organic compounds (VOC), carbon monoxide (CO) and oxides of nitrogen (NOx), are often controlled industrially by an incineration system that uses either a thermal or a catalytic process. Control of VOC and CO emissions is achieved by initiating oxidation reactions in these systems that convert the pollutants to harmless water and $CO_2$. Control of NOx is often achieved by a selective reduction reaction which reacts ammonia with NOx to form $N_2$ and water.

The abatement system is typically installed downstream of an industrial process to remove the pollutant constituents in the flue gas before the gas is emitted to the atmosphere. Thermal processes rely on homogeneous gas phase reactions for the destruction of these compounds, and normally operate at about 1500 to 1800° F. (800–1000° C.) with a residence time of about 1 second. On the other hand, the destruction reactions for catalytic processes occur at the catalyst surface rather than in the gas phase. Catalytic processes typically operate at about 600 to 1000° F. (300–550° C.) with a residence of time of about 0.1 second or less. Catalytic incineration systems are normally smaller in size, and consume less fuel than non-catalytic thermal systems.

Commercially, there are two general types of incineration designs, regenerative and recuperative, for either thermal or catalytic processes. Regenerative thermal oxidation (RTO) or regenerative catalytic oxidation (RCO) systems have very high thermal efficiency (>90%). Recuperative thermal or catalytic oxidizers typically have a heat recovery of no greater than 70%. Selection of regenerative or recuperative type of oxidizers depend primarily on the exhaust concentrations and the exhaust flows, which also affect the operating and capital costs of the abatement system. A detailed discussion of VOC control methods, including regenerative and recuperative thermal oxidation and catalytic oxidation, is set forth in Ruddy, et al., "Select the Best VOC Control Strategy", *Chemical Engineering Progress,* July 1993, pp. 28–35, incorporated herein by reference.

A typical regenerative thermal oxidation system is described in Houston, U.S. Pat. No. 3,870,474, incorporated herein by reference. In such a process, the VOCs and CO in a gas stream are incinerated at a relatively high temperature of about 1500° F. (800° C.). Before entering the combustion zone, the gas stream passes through a first packed column of heat transfer packing material which heats the gas, and then exits through an identical second packed column which is heated by the gas from the combustion zone. Thus the hot gas exiting the combustion zone passes through a packed column, heating the packing material therein. Then the flow of the gas is reversed, and the incoming gas is heated as it passes through the packed column. By the use of such regenerative processes, the efficiency of thermal incineration has been greatly increased.

A drawback of such thermal oxidation systems is that they require heating the gas stream to the relatively high temperature of about 1500° F. The 3,870,474 patent does indicate, at column 6, lines 3–7, that a suitable combustion catalyst may be placed in the warmest part of the regenerators to cause the contaminants in the air to be oxidized at a lower temperature.

Heat transfer packing materials are conventionally made up of inorganic metals or metal oxides. See Perry's Chemical Engineers' Handbook, Fifth Edition, 1973, Chapter 18, on Gas-Liquid Contacting. FIG. 18–35 illustrates typical packings such as Raschig rings, Lessing rings, Berl saddles, Intalox saddles, Tellerette and Pall rings. Ceramic packings can be almost any shape, including balls, rings or saddles. Packings are also available in a number of different sizes. Smaller-sized packings have a higher heat transfer efficiency due the higher geometric surface are per unit reactor volume, but a higher pressure drop as well. The optimal packing size and reactor dimensions are chosen to match the requirements of the auxiliary system components, such as blowers, fans, duct dimensions, etc.

A great advantage of using catalysts made of heat transfer packing materials is that the catalyst bed itself is also the effective source of heat storage for the regenerative heat transfer. Thus, regenerative systems incorporating these catalyst materials will inherently have reduced total bed dimensions than those systems that use catalysts of poor heat transfer/storage materials. Further, the shapes of heat transfer packing materials are all optimized to provide low pressure drop, and high heat transfer efficiency. These same properties are key catalytic surface characteristic to achieve high mass transfer efficiency for catalytically oxidizing VOC emissions with minimal pressure loss. These unique features make the use of heat transfer packing materials as catalyst carriers highly desirable for regenerative catalytic oxidizers.

In a regenerative bed, the heat transfer packing materials are typically laid down randomly into the vessel. The packing materials normally are required to have sufficient physical strength to retain bed weight for the particular packing and vessel involved. This physical strength is generally indicated by the crush strength of the packing, which can be measured by putting a sample of the packing in a standard compression testing device, and measuring the force needed to break the packing in its weakest orientation. Additionally, these packing materials need very high cohesive strength to resist erosion that may be caused by interparticle abrasion, loading and unloading, etc, and adhesive strength to retain catalyst bound to the surface. For catalyzed heat transfer packings, the erosion resistance is particularly important as erosion is a key likely cause for the deactivation of the catalyst effectiveness.

European Patent Application No. 629432, published Dec. 12, 1994, describes a heat transfer packing material with catalyst and/or adsorbent on its surface for use in a regenerative incineration process. In this publication, the catalyst is applied as a slurry washcoat to the exterior of low porosity heat transfer packing, such as ceramic saddles. As described in the publication, the catalyst ingredients in such washcoats are supported on high surface area inorganic oxide powders which are in turn deposited on the surface of the ceramic substrates. However, the slurry washcoats have been found to adhere poorly to the heat transfer packing materials, typically ceramic substrates. Under normal operating conditions, these slurry coated catalyst materials are prone to deactivation due to attrition.

Another known method of placing catalyst onto any support is by solution impregnation, in which the catalysts is impregnated from a solution into the pores of the support material. However, most existing heat transfer packing materials do not have required surface properties to allow such impregnation and to provide high catalytic activity. The key reason is that commercial packing materials are normally very dense, and lack the microstructure needed for catalytic activity and the porosity needed to allow solution impregnation. This is due, in part, to the need of high physical strength of such packing materials. To obtain such strength, packing materials are typically precalcined at elevated temperatures which results in the loss of porosity and the collapse of micro surface area structure. As a result, a catalyst of high physical strength combined with high catalytic activity has not been commercially available.

SUMMARY OF THE INVENTION

In accordance with the present invention, we have discovered that high strength, high activity catalyst can be manufactured by using packing materials with desirable micro surface structure, as measured by minimum values of BET surface area and porosity. BET surface area impacts the activity of the catalyst, and porosity impacts the capacity of impregnating catalytic ingredients onto the catalyst. The catalysts are catalyst impregnated heat transfer packing materials that incorporate high catalytic activity and high surface strength suited for catalytic reactions.

In the method of the present invention, the catalytic ingredients are imbedded into heat transfer packing materials to form "homogeneous" catalytic material. This is in contrast to previously known composite forms where catalyst is adhered in segregated layers coated on the outside of packing materials. The homogeneous regenerative catalytic oxidation (RCO) catalysts of the present invention have the necessary physical and catalytic properties suited for regenerative catalytic oxidizers.

It should be noted that for purposes of the present invention, the catalytic material does not have to be uniformly distributed throughout the substrate to be considered "homogeneous". It is sufficient that the catalytic material has been reasonably absorbed into the porous ceramic substrate so that at least some of the catalytic material is dispersed throughout the volume of the substrate material. This is in marked distinction to washcoating a slurry of catalytic material on to the outside of a non-porous substrate.

The homogeneous catalyst is prepared by impregnating porous ceramic packing material substrate with a solution of a soluble catalyst precursor form of the catalyst. The catalyst precursor is then fixed into active catalyst by reducing, oxidizing or otherwise reacting the soluble catalyst precursor to change it to its active catalytic form. In the case of noble metals, the active catalytic form is generally elemental metal, while in the case of base metal catalysts, the catalytic form is generally base metal oxide. The substrate with the absorbed solution is dried and calcined to leave catalytically active material on the surface of the packing material as well as dispersed throughout the material, and to remove solvent and organic residue.

The porous ceramic packing material should have a minimum porosity of about 0.05 cm$^3$/g and a BET surface area of at least about 4 m$^2$/g. The minimum porosity is desirable to ensure adequate absorption of the solution of catalyst precursor. The minimum surface area has been found to be desirable to provide a desired level of catalytic activity. However, for particular substrates, catalysts and catalytic processes, lower levels of porosity and surface area may be acceptable.

Catalyst ingredients include, but are not limited to, noble metals, such as Pt, Pd, Rh, Ir, Re, and base metal oxides, such as $MnO_2$, $Cr_2O_3$, $CeO_2$, CuO, $V_2O_5$, $WO_3$. The solution may be an aqueous or non-aqueous (organic solvent) solution. Any desired catalyst compound may be used provided the compound is soluble in the chosen solvent and can be fixed to the desired metal or metal oxide upon heating in air at elevated temperatures, or upon be subjected to a chemical fixing process.

The substrate material can be any porous ceramic material which is capable of acting as heat transfer packing. It is desirable that the substrate material be inert to the catalytic components and the gas to which it is exposed. Examples of suitable ceramic materials include alumina, sillimanite, petalite, cordierite, mullite, zircon, zircon mullite, spodumene, titania, alumina-titanate, etc. A preferred substrate material is alumina, either in substantially pure form, or as a component of a naturally occurring ore such as bauxite. A particularly preferred substrate comprises gamma alumina. In order to be active catalytically, the packing material should have at least the above values of porosity and BET surface area for the supports.

The homogeneous catalytic packing material of the present invention can be used in a regenerative catalytic oxidation process. In such an RCO process, a gas stream containing oxygen and waste gases, such as volatile organic compounds (VOCs), carbon monoxide or combinations thereof, is passed over and contacted with the catalytic packing material under operating conditions which promote the oxidation of the waste gases to $CO_2$ and water. Such operating conditions include the temperature and gas flow rate, and depend, among other things, on the particular catalyst and the gas being treated. Appropriate operating conditions may be readily determined by one skilled in the art.

The regenerative catalytic oxidation (RCO) process of the present invention can also be conducted by modifying a non-catalytic regenerative thermal oxidation (RTO) process. In such case, a portion of the non-catalytic RTO packing is replaced by the RCO packing of the present invention, or RCO packing is added to the existing RTO packing. Preferably, the RCO packing is substituted or added as a layer at the hottest point in the packing tower, which is generally at the point where the gas enters the tower after combustion. It is at this point in the process that the catalyzed packing is most useful to promote the oxidation of waste gases. Furthermore, if the RCO packing is maintained as a separate layer, then the RCO and RTO packing materials can be replaced or recycled independently. This allows independent selection of the best packing materials for the RCO and the RTO processes. That is, the RTO packing material does not have to meet the porosity, surface area and other requirements of the packing which is used in the RCO packing material. Thus a packing material with optimum thermal and other properties may be used as the RTO packing material, even though such a packing may not be suitable for use in forming RCO packing by the process of the present invention. Further, the RCO and RTO packing materials may not have to be serviced on the same schedule. Further savings may be realized because the catalyst containing RCO catalyst is generally more expensive than the RTO catalyst.

The ceramic packing material can be impregnated with an aqueous solution of catalyst precursor by any suitable means, as is well known in the art. A simple method to apply the precursor solution is to immerse the packing substrates directly into the solution. However, although good results can be obtained using this simple method, it has been found that simple immersion techniques require an excess of catalyst solution, and may result in variable levels of catalyst deposition. The use of excess catalyst solution may not be a problem when a base metal catalyst is used, but can greatly increase the cost of production when a precious metal catalyst is used.

A preferred method for applying the catalyst solution to the ceramic substrate is by an incipient wetness application process, as discussed, for example, in U.S. Pat. No. 4,134,860, incorporated herein by reference. The point of incipient wetness is the point at which the amount of liquid added is the lowest concentration at which the substrate is sufficiently dry so as to absorb essentially all of the liquid. In this way an aqueous solution of a relatively expensive soluble catalyst salt, such as a platinum solution, can be coated onto the substrate using only as much solution as is absorbed into the porous substrate. Furthermore, when the incipient wetness method is used, the amount of catalyst applied to the substrate can be accurately and consistently controlled.

DESCRIPTION OF THE PREFERRED EMBODIMENT

When noble metals are used as components of the catalyst, the noble metals are impregnated from solution into the porous substrate. The solution comprises a soluble form of the noble metal in a suitable solvent. For purposes of this application, the soluble form of the noble metal catalyst is referred to as the "catalyst precursor", while the active elemental form is referred to as the "catalyst". Such noble metals include, but are not limited to, the platinum group metals (platinum, palladium, rhodium, iridium, osmium and ruthenium), as well as other noble metals including rhenium, gold and the like. Impregnation may be carried out by techniques well known to those of ordinary skill in the art. The solvent is then driven off, generally by drying, and the soluble noble metal compound is fixed to its catalytic active form by reducing to elemental metal. Methods for reducing the noble metal compound to elemental metal include calcining at elevated temperature in air, or using a chemical reactant, such as an acid, to form the elemental metal. For the method of the present invention, the chemical process is preferred because it generally reduces the calcining temperature needed to obtain the final elemental metal impregnated product. Good results have been obtained by first drying the impregnated substrate, immersing the substrate in acid, such as acetic acid, and then further drying and calcining at mild temperatures to remove residual solvent and organic material.

The metal may be dispersed onto the substrate by impregnating the material with a solution containing a compound of the desired platinum group metal(s). The solution may be an aqueous or non-aqueous (organic solvent) solution. Any platinum group metal compound may be used provided the compound is soluble in the chosen solvent and decomposes to the metal upon heating in air at elevated temperatures. Illustrative of these platinum group metal compounds are chloroplatinic acid, ammonium chloroplatinate, bromoplatinic acid, platinum tetrachloride hydrate, platinum dichlorocarbonyl dichloride, dinitrodiamino platinum, amine solubilized platinum hydroxide, rhodium trichloride, hexaamminerhodium chloride, rhodium carbonylchloride, rhodium trichloride hydrate, rhodium nitrate, rhodium acetate, chloropalladic acid, palladium chloride, palladium nitrate, diamminepalladium hydroxide and tetraamminepalladium chloride.

When base metal catalysts are used, the impregnation process is essentially the same as for platinum group metals, except the final catalytic material is the base metal oxide. As above, the "catalyst precursor" is a soluble form of the base metal, which is dissolved in a suitable solvent, while the "catalyst" is the base metal oxide. Such base metals include manganese, chromium, cerium, copper, vanadium, and tungsten, as well as many others which have been identified in the art. A solution of the base metal is impregnated into the packing, and then the solvent is driven off, typically by drying. The catalyst precursor is then fixed into catalyst either by calcination in air or by chemical reaction.

Soluble forms of base metals are well known in the art. For example, suitable manganese oxide precursors include solutions of manganese nitrate, manganese acetate, manganese dichloride or manganese dibromide. In like manner, to produce ceria or cobalt oxide catalysts, soluble cerium or cobalt compounds such as cerium nitrate, cerium acetate, cerium sulfate or cerium chloride, and cobalt nitrate, cobalt chloride or cobalt bromide may be used. Particularly good results have been obtained using an aqueous solution of cerium nitrate as the catalyst precursor to form ceria catalyst, and by using cobalt nitrate to form cobalt oxide catalyst.

The impregnation of the substrate with the metal compound solution may be carried out in ways well known in the art. One convenient method is to place the substrate material into a rotary evaporator which is partially immersed in a heating bath. The impregnating solution which contains an amount of the desired metal compound to provide the desired concentration of oxide or metal in the finished catalyst is now added to the substrate and the mixture cold rolled (no heat) for a time from about 10 to 60 minutes. Next, heat is applied and the solvent is evaporated. This usually takes from about 1 to about 4 hours. At this stage, the catalyst material is preferably fixed to the noble metal or base metal oxide forms by chemical reactions. Finally, the coated substrate is removed from the rotary evaporator and calcined in air to remove residual solvent and organics, and to fix the catalyst if not previously fixed by chemical means. Typically, calcination is at a temperature of about 300° C.–600° C. for about 1 to 3 hours. When chemical fixation is used, the calcination temperature is preferably about 300–450° C. When the calcination is also being used to fix the catalytic metal, then temperatures of about 500–600° C. are preferably used. Because calcining at higher temperatures may reduce the BET surface area of the final product, it is desirable to use a chemical fixation method which allows for calcining at lower temperatures.

As discussed above, a preferred method for applying a precious metal solution to the substrate is by an incipient wetness method. In this process, the packing material substrate is placed into a planetary mixer and the impregnating solution is added under continuous agitation until a state of incipient wetness is achieved. The substrate is then dried to remove the solvent. For aqueous solutions, drying is typically in an oven for 4–8 hours, followed by calcining at about 300° C.–600° C. for about 1–3 hours, as discussed above.

The packing material substrate of the instant invention may be in any configuration, shape or size which exposes it to the gas to be treated. For example, the substrate material can be formed into shapes such as tablets, pellets, granules, rings, spheres, saddles, etc. Saddles have been found to be particularly suitable for use in RCO systems.

The substrate material can be any porous ceramic material which is capable of acting as heat transfer packing. It is desirable that the substrate material be unreactive with the catalytic components and not be degraded by the gas to which it is exposed. Examples of suitable ceramic materials include alumina, sillimanite, petalite, cordierite, mullite, zircon, zircon mullite, spodumene, titania, alumina-titanate, etc. A preferred substrate material is alumina, either in substantially pure form, or as a component of a naturally occurring ore such as bauxite.

As discussed above, in a regenerative bed, the heat transfer packing materials are typically laid down randomly into the vessel. The packing materials are required to have sufficient physical strength to retain bed weight for the particular packing and vessel involved. This physical strength is generally indicated by the crush strength of the packing, which can be measured by putting a sample of the packing in a standard compression testing device, and measuring the force needed to break the packing in its weakest orientation. For one-inch saddle shaped packing, a crush strength of at least about 50 pounds is desirable, preferably at least about 100 pounds.

Additionally, these packing materials need very high cohesive strength to resist erosion that may be caused by interparticle abrasion, loading and unloading, etc, and adhesive strength to retain catalyst bound to the surface. For catalyzed heat transfer packings, the erosion resistance is particularly important as erosion is a key likely cause for the deactivation of the catalyst effectiveness. A simple test of cohesive strength is rubbing the packing material with one's finger, or some suitable material, and seeing whether any ceramic comes off the surface as powder. Such powdering is an indication of poor cohesion.

EXAMPLE 1

In this example ⅝ inch bauxite balls were used as the packing material substrate and platinum as the catalyst. The bauxite balls had a density of 47 lbs/ft$^3$, a surface area of 150–180 m$^2$/g, and a water absorptivity of 5–10%, by weight. The platinum catalyst precursor solution in this and all of the examples was an 18% aqueous Platinum A solution, which is an amine solubilized aqueous platinum hydroxide ($H_2Pt(OH)_6$) solution containing 18 weight percent platinum, commercially available from Engelhard Corporation. The balls were immersed in the platinum solution for 20 minutes. The balls were then air dried, then dried at 150° C. for 2 hours, and calcined at 500° C. for 2 hours. The final catalytic packing material was found to contain 0.36% platinum, by weight.

Examples were also prepared using the same bauxite ball substrate, and ceria and cobalt oxide as the catalysts. In one example, the balls were immersed in an aqueous cerium nitrate solution, and dried and calcined as above. The final catalytic packing material was found to contain about 5% ceria, by weight. In another example, the balls were immersed in cobalt nitrate solution, and dried and calcined as above. The final catalytic packing material was found to contain about 5% cobalt oxide, by weight.

EXAMPLE 2

In this example one-inch bauxite saddles were used instead of the bauxite balls. The saddles had a density of 47 lbs/ft$^3$, a surface area of 150 m$^2$/g, and a water absorptivity of 10–15%, by weight. The saddles were immersed in platinum solution at 75° C. overnight. The saddles were then air dried, then dried at 150° C. for 2 hours, and calcined at 500° C. for 2 hours. The final catalyst was found to contain 0.06% platinum, by weight.

EXAMPLE 3

In this example one-inch alumina saddles were used instead of the bauxite balls. The saddles had a density of 37 lbs/ft$^3$, a surface area of 10 m$^2$/g, and a water absorptivity of 22%, by weight. The saddles were immersed in a platinum solution at 95° C. overnight. Sodium formate was then added to the solution to fix the platinum into the saddles. The saddles were then air dried, dried at 150° C. for 2 hours, and calcined at 500° C. for 2 hours. The final catalyst was found to contain 0.04% platinum, by weight.

EXAMPLE 4

A test was devised to measure the abrasion resistance of packing materials. The abrasion test procedure is to load packing materials, in this case all 1-inch saddle size, to occupy about 50% of a 4-inch diameter by 6-inch length plastic jar. Except test sample saddles, all other saddles in the jar were ceramic Inalox saddles (Koch Flexisaddle™). This jar is then placed on a twin roller set to rotate at a speed of 60 revolutions per minute. After 1 hour of rotation, the weight loss of the sample packing material is measured. This weight loss is an indication of the ability of packing materials to resist abrasion that will occur from interparticle erosion in actual use. A guideline of less than about 20% weight loss of the catalytic material is needed in order to pass the abrasion test.

EXAMPLE 5 [Comparative]

Comparative washcoated catalyzed packing materials were formulated by preparing slurries of gamma alumina, which had a BET surface area of 150 m$^2$/g, in which the alumina was pre-impregnated with Pt. The solid content in the slurry was typically 30 to 45%. Binders such as colloid $SiO_2$ or colloid $ZrO_2$ solutions (up to 10%) were also added to some slurries for the purpose of enhancing adhesion. Ceramic saddles were immersed into these slurries for washcoating of Pt/alumina onto the ceramic saddles. Normal washcoat loading was 50 to 150 mg per cubic inch of saddle volume. The coated packing materials were then air dried and calcined to 500° C. for 1 hour. These saddles were then subjected to the abrasion test procedure given in Example 4. Results showed that all washcoated saddles, with or without added binders, failed to pass the above adhesion tests. After the abrasion testing, all washcoated layers were essentially stripped off from their ceramic saddles.

Some ceramic saddles were sand blasted and acid etched to increase surface roughness. These saddles were then washcoated with Pt/alumina slurries. After subjecting to the above adhesion tests, catalyst washcoats again failed to adhere to these roughened saddles.

EXAMPLE 6 [Comparative]

Stoneware saddle (Flexisaddle™) packings with the physical properties of less than 2 m$^2$/g BET surface area and 0.1 to 0.3% porosity were immersed directly into a platinum solution then dried at 150° C. for 2 hours, and calcined at 500° C. for 2 hours. Pt loading was about 6 g/ft$^3$. These saddles were then subjected to the abrasion test described in Example 4. These catalyzed saddles showed very little abrasion loss, less than 1%.

Activity and durability tests for these catalyzed saddles were done by measuring CO conversion across these saddles after they were broken to <¼-inch size. Activity tests were conducted at 20,000 hr$^{-1}$ volumetric space velocity, 250 ppm CO in air and 300° C. temperature. The durability tests were determined by aging catalyst at 550° C. in the presence of 10% water in air for 16 hours followed by activity testing. Even though this catalyst gave reasonably good fresh activity, 80 to 90% CO conversion, the catalyst deactivated severely, down to less than 6% CO conversion after durability aging. Hence, catalyzing packing of low BET, low porosity materials do not provide satisfactory catalytic activity.

EXAMPLE 7 [Comparative]

Stoneware saddle (Flexisaddle™) packings as used in Example 6 were first leached with 10% alkaline (NaOH) followed by nitric acid washing. This step was made to remove possible residual soluble impurities. After 300° C. drying for 1 hour, the leached saddles were then impregnated with Pt following the same procedure given in Example 6 to give a Pt loading of about 6 g/ft$^3$. Activity tests on this sample also showed rapid conversion loss, from 90% fresh down to 8% CO conversion after aging. The results shown in Examples 6 and 7, demonstrate that the activity loss after aging was due to low BET area and low porosity, and not due to contamination effects.

EXAMPLE 8

A total of 1755 grams of naturally occurring –200 mesh bauxite powder was mixed dry with 945 grams of EPK Florida Kaolin and 176 grams of organic binder, which was a mixture of polyethylene oxide and hydroxymethyl cellulose from Dow Chemical Company. Mixing was done in a sigma blade type mixer. An aqueous solution of deionized water:diethanolamine:silica sol was prepared at ratios of 85:3.5:1, respectively. A total of 967 grams of this solution was added to the dry mix. Mixing continued until an extrudable paste was formed. The paste was extruded using a piston extruder and a mould which produces profile of 15 mm span saddle. The extruded saddle profiles were cut and formed into saddle shape in their wet stage using a half-moon shaped die with a contour of the negative of the saddle profile. The saddles were then air dried and fired up to 1200° C.

EXAMPLE 9

A total of 1755 grams of –200 mesh alumina trihydrate bauxite powder was mixed dry with 945 grams of EPK Florida Kaolin and 176 grams of organic binder, which was a mixture of polyethylene oxide and hydroxymethyl cellulose from Dow Chemical Company. Mixing was done in a sigma blade type mixer. An aqueous solution of deionized water:diethanolamine:silica sol was prepared at ratios of 85:3.5:1, respectively. A total of 967 grams of this solution was added to the dry mix. Mixing continued until an extrudable paste was formed. The paste was extruded using a piston extruder and a mould which produces profile of 15 mm span saddle. The extruded saddle profiles were cut and formed into saddle shape in their wet stage using a half-moon shaped die with a contour of the negative of the saddle profile. The saddles were then air dried and fired at 1200° C. Products produced by this method were found to have BET surface areas in the range of 6–10 m$^2$/g.

EXAMPLE 10

Mixtures of bauxite or Al(OH)$_3$ with clay materials (Tennessee M&D Clay or EPK Clay) were extruded to form saddles followed by firing to different temperatures. As the firing temperature increased, the strength of saddle became higher, and the skin became harder to rub off as powder with one's fingers. However, as temperature increased, the BET area decreased. Saddles made of 50% bauxite and 50% M&D clay were measured to lose BET area from 94 m$^2$/g at 500° C., to 87 m$^2$/g at 650° C., and to 67 m$^2$/g at 740° C. calcination temperature. All these saddles had about 15 to 30% porosity. After 740° C. calcination, the saddles did not have suitable cohesiveness to survive the tumbling as set forth in Example 4. These saddles could be made to meet the adhesion test, but the calcination temperature had to be raised to 1050° C. or higher. The BET surface areas of these saddles were well above the preferred minimum of 4 m$^2$/g, but typically below about 30 m$^2$/g.

EXAMPLE 11

Homogeneous regenerative catalytic oxidizers can be produced by using high surface area boehmite based aluminum oxides, as opposed to gibbsite based aluminum hydroxides, such as bauxite and alumina mono- or trihydrate. The boehmite type of aluminas include gamma, delta, theta and any other form of alumina which is produced by heat treating boehmites. For catalytic application, the preferred form of the boehmite based alumina series is gamma alumina with high surface area. Gamma alumina loses its surface area with heat treatment. Also, it is transformed, at least partially, to high temperature phases, such as theta or delta alumina. When gamma alumina based homogeneous RCO is heat treated at elevated temperatures, such as 1000° C. and above, it may retain more of its original surface area than that of gibbsite based aluminas described in previous examples. This depends on the nature of the stabilizers that are added to the gamma alumina.

EXAMPLE 12

Saddles in accordance with Examples 8, 9 and 10 were impregnated with Pt to control Pt loading of 4 to 8 g/ft$^3$ saddle volume. Durability and activity tests at the conditions given in Examples 4 and 6 were made for these saddles. Results presented in Table 1 showed that Pt catalyst impregnated saddles that have a BET surface area of 6 m$^2$/g or higher and a porosity of 18% or higher all maintained high CO activities. The last column shows the results of abrasion tests in accordance with the test procedure of Example 4. However, saddles which fail the abrasion test may still be suitable for some uses not requiring high abrasion resistance.

TABLE 1

| Ex. No. | BET Area (m$^2$/g) | Fresh conversion | Aged conversion | Abrasion test |
|---|---|---|---|---|
| 9 | 6 | 95+% | 95+% | good |
| 9 | 8 | 95+% | 95+% | good |
| 9 | 10 | 95+% | 95+% | good |
| 10 | 67 | 95+% | 95+% | fail |
| 10 | 87 | 95+% | 95+% | fail |
| 8 | 100 | 95+% | 95+% | fail |
| 8 | 150 | 95+% | 95+% | fail |

EXAMPLE 13

In this example, the saddles described in Example 9 were impregnated with catalyst by the incipient wetness method. Platinum A solution in an amount equal to 22% of the saddle weight was sprayed on the saddles while they were being tumbled until all the platinum solution was absorbed. It should be noted that the cohesive strength of the saddles is important to prevent damage during such coating operations. The coated saddles were then air dried and calcined at 500° C. for 2 hours. Alternatively, the impregnated saddles can be air dried, followed by spraying with an acid solution, such as acetic acid, to fix the platinum in elemental form, and then further air dried and calcined at 400° C. for 1 hour. As discussed earlier, calcining can reduce the BET surface area, and reducing the calcining temperature can therefore improve, i.e. increase, the final BET surface area. The activity results of the incipient wetness impregnated saddles were the same as those reported in Example 12.

What is claimed is:

1. A method of making homogeneous catalytic regenerative heat transfer packing material, the method comprising the steps of impregnating a porous ceramic packing material substrate with a solution of a catalyst precursor wherein said impregnating step comprises an incipient wetness application process, and then fixing the catalyst precursor into catalyst, wherein the fixing step comprises calcining the impregnated material at a temperature of about 300 to 600° C., and wherein the packing material substrate has a minimum porosity of about 0.05 $cm^3/g$ and a BET surface area in the range of at least about 4 $m^2/g$ to about 30 $m^2/g$.

2. The method of claim 1 wherein the catalyst comprises a noble metal or a base metal oxide, and the catalyst precursor is a soluble compound of such noble or base metal.

3. The method of claim 2 wherein the catalyst is a platinum group metal.

4. The method of claim 1 wherein the packing material substrate is in the form of saddles, balls, pellets or rings.

5. The method of claim 1 wherein the catalyst solution is an aqueous solution.

6. The method of claim 1 wherein the calcining is carried out at a temperature of about 400° C. to 600° C.

7. The method of claim 1 wherein the chemical treating comprises treating the impregnated packing material substrate with an acid solution.

8. The method of claim 7 wherein the acid solution is acetic acid solution.

9. The method of claim 1 wherein the calcining is carried out at a temperature of about 400° C. to 450° C.

10. The method of claim 1 wherein the packing material substrate is formed from a ceramic selected from the group consisting of alumina, bauxite, sillimanite, petalite, cordierite, mullite, zircon, zircon mullite, spodumene, titania and alumina-titanate.

11. The method of claim 10 wherein the ceramic comprises alumina or bauxite.

12. The method of claim 11 wherein the ceramic comprises gamma alumina.

13. The method of claim 1 wherein the catalyst comprises a noble metal.

14. Homogeneous catalytic regenerative heat transfer packing material comprising a porous ceramic packing material substrate impregnated with one or more noble metal or base metal oxide catalysts or combinations thereof, wherein the packing material substrate has a minimum porosity of about 0.05 $cm^3/g$ and a BET surface area in the range of at least about 4 $m^2/g$ to about 30 $m^2/g$, wherein said packing material is made by a method comprising the steps of impregnating a porous ceramic packing material substrate with a solution of a catalyst precursor, wherein said impregnating step comprises an incipient wetness application process, and then fixing the catalyst precursor into catalyst, wherein the fixing step comprises calcining the impregnated material at a temperature of about 300 to 600° C.

15. The catalytic packing material of claim 14 wherein the catalyst comprises one or more platinum group metals.

16. The catalytic packing material of claim 14 wherein the packing material substrate is in the form of saddles, balls, pellets or rings.

17. The catalytic packing material of claim 14 wherein the packing material substrate is formed from a ceramic selected from the group consisting of alumina, bauxite, sillimanite, petalite, cordierite, mullite, zircon, zircon mullite, spodumene, titania and alumina-titanate.

18. The catalytic packing material of claim 17 wherein the ceramic comprises alumina or bauxite.

19. The catalytic packing material of claim 18 wherein the ceramic comprises gamma alumina.

20. A regenerative catalytic oxidation process which comprises contacting a gas stream containing oxygen and waste gases selected from the group of volatile organic compounds, carbon monoxide and combinations thereof over homogeneous catalytic regenerative heat transfer packing material under operating conditions which promote the oxidation of the waste gases wherein said packing material is made by a process as claimed in claim 1.

21. The process of claim 20 wherein the homogeneous catalytic regenerative heat transfer packing material comprises a porous ceramic packing material substrate impregnated with one or more noble metal or base metal oxide catalysts or combinations thereof.

22. The process of claim 20 wherein the homogeneous catalytic regenerative heat transfer packing material is made by a method comprising the steps of impregnating a porous ceramic packing material substrate with a solution of a catalyst precursor and then fixing the catalyst precursor into catalyst.

23. The process of claim 20 further comprising passing the gas stream over non-catalytic regenerative heat transfer packing material.

24. The process of claim 23 wherein the catalytic and non-catalytic regenerative heat transfer packing materials are in distinct layers.

* * * * *